United States Patent [19]

Klapdor et al.

[11] Patent Number: 5,670,129
[45] Date of Patent: Sep. 23, 1997

[54] METHOD FOR SYNTHESIZING ALUMINUM HYDRIDE

[75] Inventors: Astrid Klapdor; Wilfried Knott; Dagmar Windbiel, all of Essen, Germany

[73] Assignee: Th. Goldschmidt AG., Essen, Germany

[21] Appl. No.: 564,842

[22] Filed: Nov. 29, 1995

[30] Foreign Application Priority Data

Dec. 24, 1994 [DE] Germany .................. 44 46 516.5

[51] Int. Cl.$^6$ .................................................. C01B 6/00
[52] U.S. Cl. ............... 423/645; 252/188.27; 423/497
[58] Field of Search .................. 252/188.27; 423/497, 423/498, 645

[56] References Cited

U.S. PATENT DOCUMENTS

| | | |
|---|---|---|
| 3,758,677 | 9/1973 | Kraus et al. . |
| 3,801,657 | 4/1974 | Scruggs . |
| 3,810,974 | 5/1974 | King .................. 423/645 |
| 3,819,819 | 6/1974 | Matzek et al. . |
| 3,822,342 | 7/1974 | Reigler et al. . |
| 3,829,390 | 8/1974 | Ashby et al. . |
| 3,857,930 | 12/1974 | Kraus et al. . |
| 3,971,846 | 7/1976 | Skelcey . |
| 4,006,095 | 2/1977 | Hoffmann et al. . |
| 4,048,087 | 9/1977 | Daniels et al. .......... 423/645 |
| 4,832,934 | 5/1989 | Bogdanovic et al. . |
| 5,273,686 | 12/1993 | Bogdanovic et al. ........ 423/645 |
| 5,565,183 | 10/1996 | Knott ........................ 423/645 |

FOREIGN PATENT DOCUMENTS

| | | |
|---|---|---|
| 589731 | 12/1959 | Canada ........................ 423/645 |
| 0003564 | 8/1979 | European Pat. Off. . |
| 0490156 | 6/1992 | European Pat. Off. . |
| 0594014 | 4/1994 | European Pat. Off. . |
| 845338 | 7/1952 | Germany . |
| 785348 | 10/1957 | Germany . |
| 4336602 | 5/1995 | Germany . |

OTHER PUBLICATIONS

Ullmann's Encyclpedia of Industrial Chemistry, High Performance Fibers to Imidazole and Derivatives, vol. A 13, 213–214.

Finholt, A.E.; Bond, A.C.; and Schlesinger, H.I., Lithium Aluminum Hydride, Aluminum Hydride and Lithium Gallium Hydride, and Some of their Applications in Organic and Inorganic Chemistry, contribution from the George Herbert Jones Laboratory, University of Chicago, vol. 69, 1199–1203 (May 1947).

Ashby, E.C.; Schwartz, R.D.; and James, B.D., Concerning the Preparation of Magnesium Aluminum Hydride. A Study of the Reactions of Lithium and Sodium Aluminum Hydrides with Magnesium Halides in Ether Solvents, contribution from The School of Chemistry, Georgia Institute of Technology, Atlanta, Georgia, vol. 9, No. 2, 325–332(Feb. 1970).

*Primary Examiner*—Wayne Langel
*Attorney, Agent, or Firm*—Anderson Kill & Olick, P.C.

[57] ABSTRACT

The invention relates to a method for the preparation of toluene solutions of aluminum hydride, which is free of ethers and halides, characterized in that the complex, bound magnesium halide portion is precipitated and removed from halogen magnesium aluminum hydridohalides, which optionally are present in tetrahydrofuran (THF) solutions, of the general formula $$(Mg_2X_3(THF)_y)^+(AlH_3X)^-$$

wherein

X is chlorine, bromine or iodine

Y is a number from 0 to 6, by the consecutive addition of hexane and toluene with successive removal by distillation of hexane and optionally of THF at boiling temperatures up to 90° C. Solutions of aluminum hydride in toluene are obtained, which can be used directly for reductions or yield solid aluminum hydride after removal of the solvent.

1 Claim, No Drawings

METHOD FOR SYNTHESIZING ALUMINUM HYDRIDE

FIELD OF THE INVENTION

The invention relates to a method for the economic synthesis of aluminum hydride, which is free of ether and halide.

BACKGROUND INFORMATION AND PRIOR ART

Methods for synthesizing aluminum hydride preparations, which contain ether or are dissolved in ether, have long been part of the state of the art.

Finholt, Bond and Schlesinger (J. Am. Chem. Soc. 69, 1199, (1947) describe the synthesis of aluminum hydride ($AlH_3$) in diethyl ether from $AlCl_3$ and LiH according to the equation $$AlCl_3 + 3LiH \rightarrow AlH_3 + 3LiCl.$$

This reaction, however, easily continues further to lithium aluminum hydride ($LiAlH_4$), which is formed by the following exothermic reaction:

$$AlH_3 + LiH \rightarrow LiAlH_4.$$

According to Ullmann's Encyclopedia of Industrial Chemistry, vol. A 13, pages 213–14, (1989), aluminum hydride advisably is prepared starting from lithium alanate by reaction with aluminum chloride or mineral acids in diethyl ethers:

$$3LiAlH_4 + AlCl_3 \rightarrow 4AlH_3 + 3LiCl$$

$$LiAlH_4 + HX \rightarrow AlH_3 + LiX + H_2$$

(HX=HCl or $H_2SO_4$).

The use of the expensive lithium aluminum hydride, the handling of which is not without danger, is a disadvantage of this synthesis.

Attempts were therefore made early on to replace the complex hydride, $LiAlH_4$, with other, lithium-free hydrides and to make $AlH_3$ accessible in this manner.

For example, U.S. Pat. No. 3,829,390 discloses the synthesis of stable aluminum hydride solutions in lower molecular weight dialkyl ethers, which are free of chloride and lithium salt, in accordance with the equation:

$$3NaAlH_4 + AlCl_3 \rightarrow 4AlH_3 + 3NaCl$$

Although the use of lithium is avoided, this method does not escape the need for having to use an alkali aluminum hydride, which is produced in an expensive way.

Modifications of the Schlesinger process for obtaining aluminum hydride preparations, which are free of ether and halide, have been reported in large numbers. For example, the U.S. Pat. No. 4,006,095 discloses a method for preparing stable aluminum hydride solutions in benzene and/or toluene, which is characterized in that 3 moles of an alkali metal hydride are reacted with 1 mole of aluminum halide in designated aromatic solvents in the presence of a soft ether base and a tertiary amine is added for stabilization. Moreover, this method requires a small amount of lithium alanate as initiator. The claimed, 2-phase process is too expensive and thus does not represent a technical solution.

The U.S. Pat. No. 3,971,846 discloses the synthesis of ether-free aluminum hydride starting out from lithium aluminum hydride and beryllium boranate $Be(BH_4)_2$. In view of the toxicity of beryllium compounds, the method is not practical.

The patent literature has recorded a series of additional synthesis methods for special aluminum hydride preparations, which start out from the expensive starting compounds of lithium or sodium aluminum hydride, namely the U.S. Pat. Nos. 3,857,930; 3,829,390; 3,822,342; 3,819, 819; 3,801,657 and 3,758,677.

As already stated above, methods based on these sources of hydride, the handling of which is not without danger and which, moreover, are expensive, is disadvantageous. In this connection, Ullmann's Encyclopedia (loc. cit.) states that, despite a large number of potential applications, $AlH_3$ has not been commercially available so far.

There has therefore not been a lack of attempts to use magnesium hydride for preparing aluminum hydride or compounds derived therefrom.

Wiberg and Bauer arrived at the conclusion that the reaction with magnesium hydride in diethyl ether, which is analogous to the Schlesinger reaction, produces magnesium aluminum hydride having the formula $Mg(AlH4)_2$ (Zeitschrift für Naturforschung 5b, 397, (1950) and 4b, 131, (1952) as well as German patent 845 338). Later on, in Inorg. Chem. 9, pages 325–326, (1970), Ashby showed that the magnesium hydride, hydrogenolytically produced by this reaction, reacts with aluminum halide to form halogen magnesium alanate $XMgAlH_4$.

From the BE-A-785 348, a method is known for the synthesis in diethyl ether of $AlH_3$ or of $Mg(AlH_4)_2$ by the reaction in diethyl of $MgH_2$ with $AlCl_3$ in the presence of aluminum:

$$2AlCl_3 + 3MgH_2 + Al \rightarrow 2AlH_3 + 3MgCl_2 + Al$$

$$2AlCl_3 + 4MgH_2 + Al \rightarrow Mg(AlH_4)_2 + 3MgCl_2 + Al$$

Ashby (loc. cit.) has already criticized that no experimental proof of the course of the reaction and the nature of the products was given.

The method of the U.S. Pat. No. 4,832,934 once again takes up the reaction of $MgH_2$ with aluminum halide in cyclic or aliphatic ethers, the highly reactive $MgH_2$, used here, being produced by the method of the EP-B-003 564. The reaction of this special magnesium hydride, which is accessible by way of a complex system of catalysts, with aluminum halide leads to compounds of the general formula $$(Mg_2X_3(ether)_y)^+(AlH_4)^-$$

in which X is a halogen, ether is a cyclic or aliphatic ether and y a number from 0 to 6. It is pointed out explicitly in the U.S. patent that this compound cannot be synthesized using conventional, commercial $MgH_2$, even if the latter is ground, that is, activated mechanically. This is also shown in a comparison example. The use of the complex catalyst system, described in the EP-A-003 564, for the preparation of active magnesium hydride is thus absolutely essential for this method. By using dioxane, it is possible to separate out 1 mole of $MgX_2$ from the aforementioned product. A product, having the formula $XMgAlH_4$, is thus obtained. $AlH_3$ can thus not be synthesized in this way.

EP-A-594 014 is concerned with the problem of using cheap magnesium hydrides, which cannot be used according to the teachings of U.S. Pat. No. 4,832,934 because of their inactivity and are obtained without the aforementioned complex catalysts at high temperatures from the elements, for the synthesis of complex halogen magnesium aluminum hydridohalides. Contrary to the teachings of U.S. Pat. No. 4,832,934, compounds of the general formula $(Mg_2X_3(ether)_y)^+(AlH_{4-n}X_n)^-$ wherein X is halogen, y is a number from 0 to 6, n is a number from 1 to 3 and ether is an aliphatic or cycloaliphatic ether with 2 to 30 carbon atoms (with the exception of t-butyl ether and 1,4-dioxane) with a dipole moment greater than 0.5 D and a melting point lower than 0° C. are formed by grinding magnesium hydride with aluminum halide in aliphatic or cycloaliphatic ethers with 2 to 30 carbon atoms (with the exception of t-butyl ether and 1,4-dioxane).

Magnesium hydride, prepared by the method of EP-B-490 156, has proven to be particularly useful for the above method, for which magnesium hydride is used as catalyst for the hydrogenation of magnesium and is added to the magnesium, which is to be hydrogenated, before the start of the reaction in amounts of at least 1.2% by weight and with a particle size of less than 400 μm. In the following, this magnesium hydride is referred to as "autocatalytically produced magnesium hydride".

The German Offenlegungsschrift 43 36 602 discloses a method for the synthesis of aluminum hydride, for which a magnesium hydride is used, which can be obtained by reacting magnesium with hydrogen at a temperature above 250° C. and a pressure of 0.5 to 5 Mpa with the proviso that magnesium hydride, having a particle size of less than 400 μm, in amounts of at least 1.2% by weight, based on the magnesium to be hydrogenated, is added to the magnesium, which is to be hydrogenated, before the hydrogenation and that the reaction is carried out while constantly grinding the reactants, $MgH_2$ and $AlX_3$ (X=halogen) in the molar ratio of at least 3:2 in 1,4-dioxane at a temperature within the range of 20° to 110° C. for a period of 30 minutes to 5 hours.

Solutions of aluminum hydride in 1,4-dioxane are obtained here, for which the use of autocatalytically produced magnesium hydride is particularly economic and which are free of halides due to the use of dioxane. The method, however, does not provide access to an ether-free aluminum hydride.

The present invention is therefore concerned with the technical problem of producing aluminum hydride, which is free of ether and halide, in good yield and high purity on the basis of the easily accessible magnesium hydride. More particularly, the objective here is to disclose a synthesis, which is based on the easily produced halogen magnesium aluminum hydridohalides and yields aluminum hydride preparations, which are free of ether and halide and can be used directly, in the form of a solution or as a solid substance, for reducing purposes.

OBJECT OF THE INVENTION

An object of the present invention is a method for preparing a solution of $AlH_3$ which is free of any ether or halide.

SUMMARY OF THE INVENTION

Surprisingly, it was found that this objective could be accomplished by a method, which is characterized pursuant to the invention by the fact that the complex, bound magnesium halide portion is precipitated and removed from halogen magnesium aluminum hydridohalides, which optionally are present in tetrahydrofuran (THF) solutions, of the general formula $(Mg_2X_3(THF)_y)^+(AlH_3X)^-$ wherein X is chlorine, bromine or iodine, Y is a number from 0 to 6, by the consecutive addition of hexane and toluene with successive removal by distillation of hexane and optionally THF at boiling temperatures of up to 90° C.

Solutions of aluminum hydride in toluene are obtained, which can be used directly for reducing purposes or yield solid aluminum hydride after removal of the solvent.

This result is all the more surprising to those skilled in the art since, when hydrocarbons or hydrocarbon mixtures are used as means for freeing aluminum hydride from the complex halogen magnesium aluminum hydridohalides, the stabilization of the magnesium halides in the form of their dioxanates, when 1,4-dioxane is used as a precipitant, or also the ether stabilization of the aluminum hydride, which remains in solution, is omitted here.

For carrying out the inventive method, it is of great importance that the upper temperature limit be observed so that the aluminum hydride, released by the decomplexing from the halogen magnesium aluminum hydridohalides, is not decomposed. A temperature of 90° C. therefore may not be exceeded.

For the inventive procedure, THF solutions of complex halogen magnesium aluminum hydridohalides are first mixed with hexane and heated to the boiling point, the precipitation of the complex-bound magnesium halide portion, which commences readily at room temperature, is completed. While the solvent mixture is being distilled off, the THF, originating from the complex hydride, is removed and replaced by fresh hexane.

After the added solvent has been driven off, toluene is added and the distillation is continued, the stillhead temperature increasing gradually. The distillation is continued until the stillhead temperature reaches a value of about 90° C.

A solution of aluminum hydride in toluene is obtained, which is free of ether and chloride and can be separated in a known manner from precipitated magnesium halide and concentrated up to the desired concentration, keeping in mind the upper temperature limit. The solution of aluminum hydride obtained can be used directly for reductions. If necessary, the aluminum hydride can also be isolated from the solution in the form of a colorless, highly active hydride powder and, if necessary, taken up in other solvents.

Advantageously, the amount of hexane added is such that it corresponds to 1.5 to 2.5 times the amount of THF in the starting solution so that the distillation already leaves behind an almost ether free aluminum hydride.

If the solvents are not exchanged pursuant to the invention, it is not possible to precipitate the aluminum hydride in solid form as a highly active hydride powder from the organic matrix (see comparison example 3).

In particular, the occurrence of undesirable cleavage products of the ether, used for the synthesis of the halogen magnesium aluminum hydridohalide, is to be expected in the event that the temperature control, arising out of the physical data of the solvent used, is disregarded. The following Examples are provided by way of illustration and not by way of limitation.

EXAMPLE 1

Preparation of a Solution of Chlorine Magnesium Aluminum Hydridochloride in THF

Magnesium hydride (6.5 g, 0.225 moles, with a hydride content of 91%), is suspended in 400 g of tetrahydrofuran and activated by grinding in a glass ball mill. Aluminum chloride (20 g, 0.15 moles), dissolved in 160 g of tetrahydrofuran, is slowly added dropwise, a slight evolution of heat being noticeable. At the end of the addition, the reaction batch is heated to the refluxing temperature with further, continuous grinding. After one hour, the preparation is allowed to cool and then centrifuged. A clear supernatant (500 g), with a hydride content of 1.0 Moles of hydrogen/g of solution, is isolated (gas volumetric determination of hydrogen).

EXAMPLE 2

Preparation of Aluminum Hydride

The chlorine magnesium aluminum hydridochloride (350 g), prepared in Example 1, is added at room temperature to 1 L 4-neck flask and mixed with 250 mL of hexane with stirring. During this addition, precipitation of magnesium chloride can already be observed. The formulation is heated to the refluxing temperature, 250 mL of a mixture of THF and hexane being distilled off through a stillhead. During the distillation, the precipitation of the magnesium salt is completed. At the same time, there is a great increase in viscosity. Subsequently, the contents of the flask are mixed twice more with 250 mL of hexane and the distillation is continued successively. Toluene (200 mL) is then added and distilled until a stillhead temperature of 90° C. is reached.

After cooling, the formulation is filtered through a P4 sintered glass funnel. To avoid losses, the voluminous filter cake obtained is washed twice with 40 mL of absolute toluene. A complexometric analysis of the filter cake confirms the absence of aluminum.

The clear filtrate obtained is concentrated at room temperature under the vacuum of an oil pump. An almost colorless powder (3.4 g, 97% of the theoretical yield) is obtained, which is free of magnesium halide and, according to gas volumetric hydride analysis and complexometric aluminum determination, corresponds to the stoichiometric composition of $AlH_3$. For further characterization, the infrared spectrum of the product in nujol is recorded. The position of the bands at wave numbers of 1,886.6 and 1,791.7 confirm the presence of aluminum hydride. Addition of methanol to the nujol leads to evolution of hydrogen and a cancellation of these signals.

EXAMPLE 3

Comparison Example

A chlorine magnesium aluminum hydridochloride solution (350 g, 1 mmole of hydrogen/g of solution), prepared as in Example 1, is added at room temperature to a 1 L 4-neck flask and mixed with 200 mL of toluene with stirring. During this addition, a slight precipitation of magnesium chloride may be noted. The formulation is heated to the refluxing temperature and 250 mL of a mixture of THF and toluene are drawn off through a stillhead. At the same time, the precipitation of solid increases appreciably. The distillation is continued until a stillhead temperature of 90° C. is attained.

After cooling, the formulation is filtered through a P4 sintered glass funnel. To avoid losses, the filter cake is washed twice with 40 mL of absolute toluene. The clear filtrate is concentrated at room temperature under the vacuum of an oil pump. A yellow, highly viscous oil (5.3 g) is obtained which, according to a complexometric aluminum determination, contains only about ⅓ of the amount aluminum used. A gas volumetric determination of hydrogen confirms that the ratio of aluminum to hydrogen is 1:1.2.

What is claimed is:

1. A method for preparing a solution of aluminum hydride, which is free of any ethers and halides, comprising the steps of precipitating and removing a complex-bound magnesium halide portion from halogen magnesium aluminum hydridohalide present in a tetrahydrofuran (THF) solution, and having a general formula $$(Mg_2X_3(THF)_y)^+(AlH_3X)^-$$

wherein

X is chlorine, bromine or iodine,

Y is a number from 0 to 6, by the consecutive addition of hexane and toluene with successive removal by distillation of hexane and optionally of THF at boiling temperatures up to 90° C.

* * * * *